United States Patent [19]

Huh et al.

[11] Patent Number: 4,980,049

[45] Date of Patent: Dec. 25, 1990

[54] CATALYTIC CRACKING OF HEAVY OILS

[75] Inventors: Billy K. Huh, Lawrenceville, N.J.; Tsoung Y. Yan, Philadelphia, Pa.

[73] Assignee: Mobil Oil Corporation, Fairfax, Va.

[21] Appl. No.: 206,237

[22] Filed: Jun. 10, 1988

[51] Int. Cl.$^5$ ..................... C10G 11/00; C01B 17/60; B01J 20/02

[52] U.S. Cl. ................................ 208/113; 208/251 R; 502/406

[58] Field of Search ............... 208/113, 126, 127, 124, 208/298, 299, 300, 307, 120, 251 R; 502/406

[56] References Cited

U.S. PATENT DOCUMENTS

| | | | |
|---|---|---|---|
| 2,742,403 | 4/1950 | Nicholson et al. | 196/49 |
| 4,284,494 | 8/1971 | Bartnolic et al. | 208/113 X |
| 4,469,588 | 9/1984 | Hettinger, Jr. et al. | 208/251 R |
| 4,529,502 | 7/1985 | Wang | 208/113 |
| 4,642,177 | 2/1987 | Mester et al. | 208/113 |
| 4,686,204 | 8/1987 | Mester et al. | 502/406 |

Primary Examiner—Glenn Caldarola
Attorney, Agent, or Firm—Alexander J. McKillop; Charles J. Speciale; Richard D. Stone

[57] ABSTRACT

A catalytic cracking process operates with a getter additive present where hot catalyst meets heavy metals laden crude. The getter additive is a material which is selective for metals, and has a particle size/density such that the getter additive remains in the FCC unit for no more than 24 hours, and preferably is removed within one hour or less. Addition of 1–5 weight percent alumina having an average particle size of 10–40 microns will remove much of the metal content from the feed, and the metals laden additive will itself be rapidly removed from the FCC unit preventing migration of metal or degradation of the cracking operation due to the presence of metal. Preferably the additive is fine particles which are mixed with the hydrocarbon feed to the unit.

24 Claims, No Drawings

CATALYTIC CRACKING OF HEAVY OILS

BACKGROUND OF THE INVENTION

The present invention relates to the catalytic cracking of heavy hydrocarbons in general and more specifically to a method for efficiently cracking heavy hydrocarbon feed stocks, such as resids, which contain high levels of metals such as nickel and/or vanadium.

Catalytic cracking has been used for more than forty years to convert heavy charge stocks to lighter more valuable materials. There are two general types of catalytic cracking processes—fluidized bed and moving bed processes.

Fluidized catalytic cracking (FCC) is by far the most popular process. In it a charge stock contacts a stream of hot, regenerated catalyst. The charge stock cracks and in so doing it deposits coke on the catalyst. The catalyst is stripped of strippable hydrocarbons (usually with steam) and then regenerated with an oxygen containing gas (usually air).

In moving bed catalytic cracking or Thermofor catalytic cracking (TCC) the process flow is much the same in that catalyst contacts oil and cracks it and becomes deactivated with coke. The main distinction between the two processes is that the FCC process uses fine particles of catalyst, usually in the 10-80 micron range while the TCC or moving bed process uses beads or extrudates typically of $\frac{1}{8}$-1/16 inch diameter.

There has been increasing interest in cracking heavier charge stocks. Many refiners now add resid or residual fractions to the FCC feed. These materials heretofore had been fed to a coker or visbreaker or used to make asphalt for roads. As gasoline, diesel and similar distillable products are more valuable than resid, there is much economic incentive to convert the residual fraction of the crude oil into lighter products. Unfortunately there are several problems with cracking resids. One of the major ones is that the metals content of the crude oil tends to be high in the residual fractions. These metals are poisons on the FCC or TCC catalyst. Any nickel present in the feed is deposited on the FCC catalyst and adds a hydrogenation/dehydrogenation function to the catalyst. Hydrogenation/dehydrogenation components are essential in many refinery processes (such as hydrotreating, and hydrocracking) but cannot be tolerated in catalytic cracking. The downstream processing steps cannot accomodate the huge volumes of hydrogen, methane and other light gases produced during cracking when a hydrogentation/dehydrogenation component is present on the catalyst.

Vanadium is undesirable as a catalytic component, but causes an additional problem. The vanadium seems to attack the zeolite based FCC or TCC catalyst. Vanadium may act as a cancer to destroy the zeolite structure. The problems of vanadium attack on FCC catalyst are not completely understood, however it is understood that vanadium is a severe problem and that it should be removed from the feed or removed from the catalyst.

A discussion of the mechanism of vanadium poisoning is reported in Vanadium Posioning of Cracking Catalysts, Wormsbecher et al, Journal of Catalysis 100, 130-137 (1986). This reference suggests that the high temperature, steam laden atmosphere of FCC regenerators converts $V_2O_5$ into 1-10 ppm. of $H_3VO_4$. Addition of a basic alkaline earth solid, such as MgO or CaO, is proposed to neutralize this vanadic acid.

Some attempts have been made at adjusting FCC (or TCC) operation to accomodate higher metals levels. The Phillip's metals passivation process is a popular way of passivating the metal contaminants, particularly Ni present in the feed. Typically, antimony and tin compounds are added to the feed to passivate the nickel and vanadium, respectively. In practicing metals passivation the metals still accumulate on the catalyst, however their bad effects are moderated by the addition of antimony or other materials.

Another approach has been to remove some of the catalyst from the catalytic cracking unit and send it to a metals recovery unit, and perhaps recycle the catalyst back to the FCC unit.

Plank in U.S. Pat. No. 2,668,798, was one of the first to address the problem of catalyst deactivation. He studied the poisioning of an amorphous cracking catalyst with nickel. The examples used steam and acid treatment of spent catalyst to remove nickel. This treatment was thought to be suitable for removal of other metal contaminants such as copper, iron, vandium, and the like.

The DEMET process provides a multistage procedure for treating catalytic cracking catalyst to remove much of the metals content and restore much of the original activity of the catalyst. A catalyst demetallization process is discussed more fully in U.S. Pat. No. 4,686,197, and EP No. 0 252 659 A1.

Another approach has been to modify the FCC catalyst, or provide an additive catalyst, which can trap the nickel/vanadium components in the feed. This material, sometimes referred to as a "getter", or "scavenger" is one which preferentially adsorbs metals from the feed, so that they do not remain in the feed to be adsorbed by the FCC catalyst. Such a scavenger was disclosed by Wormsbecher et al, in a paper presented at the Ninth North American Catalyst Society Meeting, Houston Tex., Mar. 18-21 ,1985.

Most refiners also practice careful cracking catalyst inventory control when cracking heavy feeds. Catalyst removal rates of 1-2 weight percent a day are typical in FCC processing to maintain catalyst activity. When heavy, metals laden feed is used catalyst addition rates may double, quadruple or go even higher to maintain the level of metals in the FCC catalyst inventory.

Unfortunately, all of these solutions to the problems of too much metal in the feed have their drawbacks. In general they allow the problem to be created and then try to cope with it later. Thus, most of the solutions allow the catalyst to be poisoned and then try to cope with it by metals passivation, dumping catalyst and replacing it more frequently, or removing a slip stream of the circulating catalyst and cleaning it up and returning it to the unit.

Addition of "getter" materials, which have an affinity for Ni, V and other impurities (including coke precursors) to the catalyst is helpful, but the getters do not function as efficiently as desired. These greater additives have a size similar to that of FCC catalyst (to remain in the unit) so their surface area is similar to that of the FCC catalyst. The FCC catalyst is always present in excess, and the FCC catalyst competes with the additives for the metal in the feed. Unless large concentrations of getter additive are present (which dilute the cracking catalyst) a lot of metal is till deposited on the cracking catalyst. The metal captured by the getter additive remains in the unit, and may form vanadic acid. The metals that accumulate on the greater may transfer metal to the FCC catalyst. The metals on the getters do as much harm as that on the FCC catalyst.

We realized that the most efficient way to deal with the problem of too much metals in the feed was to attack the problem at its source, i.e., to intercept the metals before they could be deposited on the catalyst. We found existing feed demetallation technology inadequate—the low cost approaches such as guard beds did not work well and more effective processes (expanded be hydrotreaters) cost too much. Both guard bed and expanded bed technology will be briefly reviewed.

Guard bed treating the feed upstream of the FCC or TCC process has not been too successful because at the relatively low temperatures of the hydrocarbon feed it is difficult to remove all of the metals from the FCC feed. The metals can be removed to some extent by treatment with ion exchange resins, or acids or bases, but none of these treatments are able to remove enough metal to be completely satisfactory. All allow a significant amount of metal to escape through the feed pretreatment step to then contaminate the catalytic cracking catalyst.

Expanded bed, high pressure hydrotreating processes such as H-Oil and LC Fining will remove metals and upgrade heavy oil feeds, but the high pressures (1000–2000 psig) and high hydrogen consumptions associated with such units make them impractical for use upstream of a catalytic cracking unit.

We have now discovered a way to efficiently remove metals from the feed, by using an extremely fine additive which is dispersed with the feed. The extremely fine additive will, in the presence of hot regenerated catalyst, be an extremely efficient getter material for recovering metals from the feed because the getter has a high surface area and is almost perfectly distributed with the feed. The getter material will be quickly removed from the FCC or TCC unit via these mechanisms because its small particle size will allow it to be blown out the unit as "fines" either with the hydrocarbon product or with the flue gas.

BRIEF SUMMARY OF THE INVENTION

Accordingly, the present invention provides A catalytic cracking process wherein a heavy, metals laden feed contacts particles of a hot regenerated catalytic cracking catalyst to crack the feed to lighter products and wherein a majority of the metals content of the feed is deposited on the catalytic cracking catalyst, characterized by adding to the catalytic cracking unit, at the point where hot catalyst contacts metals laden feed, a getter additive having an attrition index of 9–100 in the form of a particle which is of a smaller size than the catalytic cracking catalyst particle and which has an average residence time in the catalytic cracking unit of less than 24 hours. In a preferred embodiment, the getter additive is at least an order of magnitude more selective for vanadium and other metals, coke precursors, etc. than the cracking catalyst on a weight basis, the getter additive has an average particle diameter less than one half of the average particle diameter of the cracking catalyst and at the conditions existing in the cracking unit the getter additive is blown out of the unit with catalyst fines and the average residence time of the getter additive in the FCC unit is less than 10 hours.

DETAILED DESCRIPTION

FCC-TCC Units

Any conventional, or hereafter developed, FCC or TCC unit can be used, such as the FCC units described in U.S. Pat. Nos 3,821,103 and 4,422,925, which are incorporated by reference. The catalytic cracking unit, per se, forms no part of the present invention.

Although the present invention works best with a FCC unit, it can also efficiently be used in a TCC unit because the relatively fine getter material is treated by the TCC unit as catalyst fines, and will be efficiently removed in the TCC unit.

FEEDSTOCKS

The process works well with conventional feedstocks and with heavier feedstocks. It permits the use of much more resid when a mixture of conventional feed and resid is used. The unit also accomodates other unusual, metals laden feeds such as tar sands, shale oil, and similar materials which contain a large amount of metals, and/or poisons which can be removed by addition of a small size getter material to the feed.

GETTER MATERIAL

Any material which can efficiently adsorb nickel/vanadium can be used in the practice of the present invention.

Preferred getter materials are those having a greater affinity for metals than the cracking catalyst used in the system. Especially preferred are finely ground particles of coke or high surface area alumina.

The getter additive need not have any strength to speak of, in fact it is a benefit if a relatively soft, friable getter material is used, because such materials will quickly break down in the erosive environment of the catalytic cracking unit and be removed.

Suitable getter materials include:
(1) $Al_2O_3$
(2) Coke
(3) Clay
(4) MgO
(5) Carbonaceous materials such as coal charcoal, wood charcoal
(6) bauxites
(7) $Mg_2(SiO_2)_3$ (Sepiolite)

Typical FCC catalyst has an attrition index of 6–8.
The preferred physical properties of the getter material are:

|  | broad | preferred | most preferred |
| --- | --- | --- | --- |
| particle size | 10—100 | 20–50 | 30–40 |
| density g/cc | 1–5 | 1–5 | 1–5 |
| attrition indices | 9–100 | 9–80 | 10–20 |

Attrition index, as used herein, is measured by placing a 7 cc catalyst sample in one inch i.d., "U" tube. The catalyst is contacted with an air jet formed by passing humidified (60%) air through a 0.07 inch nozzle at 21 liter/min. for one hour. The attrition index (AI) can be calculated using the amount of fine fractions (0–20 microns) product and packed density correction factor (P.D.).

$$AI = 100 \times (P.D.) \frac{\text{Wt. \% fines } AA - \text{wt. \% fines } BA}{100 - \text{wt. \% fines } BA}$$

where AA=After Attrition; BA=Before Attrition; and fines=wt % (0-20 microns).

If 7 cc of soft material having an average particle size above 20 microns is put in the "U" tube, all of it is attrited to "fines" of 0-20 microns in an hour, then the attrition index will be 100.

The amount of getter material added is not that critical. It is determined more by economics, and to a lesser extent by the ability of the catalytic cracking unit to tolerate increased production of catalyst fines, than anything else. The most efficient use of getter material will be adding the smallest amount. This will ensure that the getter material is fully loaded with metal. It will usually mean that a significant amount of metal bypasses the getter material and will be deposited on the FCC or TCC catalyst. Depending on the value of eliminating more metal from the feed, it may be desirable to operate with gross excesses of getter material over that required to absorb a majority of the metals in the feed.

At least 25% of the metals present in the feed should be removed on the getter material. Preferably 50%, and most preferably more than 90%, of the metals in the heavy feed are deposited on the getter material.

As the getter material, because of its small size, will usually have at least an order of magnitude more surface area available than the FCC catalyst, and as the getter will usually be a material chosen for its high affinity for metals, the feed will typically contain from 0.01-5 wt % getter material, and preferably from 0.1-1 wt % getter material.

The getter material can comprise conventional FCC catalyst, fines recovered from downstream operations or fines obtained from a catalyst manufacturer.

The preferred materials for use in FCC units are ones which will, in the FCC unit contemplated, have a sufficiently large particle size to permit their recovery with the FCC catalyst in the riser section, and their discharge with the FCC regenerator flue gas. Ideally the particles in the regenerator will break down further or abrade, and the extremely fine dust thus generated will be removed from the FCC regenerator with the FCC flue gas. It is usually more convenient to recover getter material as part of the gas with catalyst fines rather than recover it as a slurry from downstream processing units, i.e., the FCC main column bottoms.

GETTER ADDITION

The getter material can be added to the process by any method which will ensure that the getter material will be well distributed in the feed and available when heavy, metals laden feed contacts regenerated catalyst.

The easiest way to accomplish this is probably to form a slurry of the getter material and then inject this slurry into the FCC feed, or into the base of the FCC riser.

It is also possible to inject the getter fines, either as a solid or preferably as a liquid slurry, and the FCC feed through a mixing tee and discharge the mixture into the FCC unit.

To improve mixing of getter fines with the FCC feed, it may be beneficial to add the getter at a location remote from the FCC riser so that flow, preferably turbulent flow, through the piping will aid in mixing getter material with the feed. To improve mixing, one or more static mixers may be used, as well as ultrasonic mixers (such as by use of a flapper valve). Passing the FCC feed plus getter material through a low efficiency centrifugal pump or through one or more control valves, will also aid mixing.

Preferably, the getter additive is added to the oil stream withdrawn from the main column bottoms. This stream contains catalyst fines, which are abrasive and which must be removed. The getter additive promotes settling of catalyst fines, and gives a cleaner clarified slurry oil (CSO) than was heretofore possible. The settled fines and getter slurry may then be charged to the riser, or to the FCC feed.

The getter and fines, either as a slurry in oil, or even as an aqueous slurry, may be injected into the feed or the hot regenerated catalyst stream from the regenerator, upstream of the riser. It is preferred not to inject the getter and fines into the regenerator, or downstream of the reactor riser, as too much of the getter material would be lost before it could contact heavy, metals laden feed.

GETTER RESIDENCE TIME

It is essential that the getter material, regardless of the precise shape of the getter material, or the place where it is added, have a residence time in the catalytic cracking unit of less than about one day, and preferably less than about 10 hours, and ideally one hour or less.

This short residence time is critical to the successful practice of our invention, because the intent of the present invention is to remove metal contaminents from the FCC or TCC unit, not merely to allow metals to passively accumulate in the circulating catalyst inventory.

In an FCC unit, when extremely fine getter material is used, e.g., material with less than 50 microns average particle diameter, preferably less than 10 microns average diameter, the getter will remain in the FCC unit for perhaps 5-100 minutes, after which getter will be blown out, usually with the regenerator flue gas.

If somewhat larger particles are used, e.g., having ½ the diameter of the FCC catalyst, then the getter material will survive quite a bit longer in the FCC unit but will nonetheless be rapidly eroded or attrited in the regenerator to form fine getter material which will be rapidly removed from the FCC unit.

Addition of relatively strong, dense alumina materials, with a particle size distribution similar to that of FCC catalyst, is not suitable for the practice of the present invention. Although these alumina materials will accumulate metal, they can not be easily removed from the FCC unit without also removing a significant portion of the FCC catalyst inventory. By adding the getter additive with the feed, or by adding relatively larger particles of a soft, friable getter additive to the regenertor, it is possible to control the amount of getter inventory in the FCC unit independently of control of the conventional FCC catalyst inventory. This can be an important advantage. It a supertanker of bad feed such as a heavy, metals laden resid, must be processed by the refiner it will be possible to increase the amount of getter additive simultaneously with the increase in the percentage of heavy, metals laden resid fed to the catalytic cracking unit. When the crude supply situation reverts to normal, e.g., a clean feed becomes available, then getter addition to the feed can be stopped. The getter material will have absorbed most, and preferably over 90% of the nickel and vanadium in the bad feed, and within about a day the getter will be completely removed from the unit thereby eliminating the possibility of metal migration or transfer from the getter to the conventional FCC catalyst. This is in contrast to other types of metals passivation where the metal must remain trapped forever in the FCC catalyst, or in the unit.

The concentration and vanadium affinity of getter in the FCC catalyst inventory should be sufficient to absorb most of the vanadium in the feed. Usually operation with a catalyst inventory containing 0.1 to 10 wt. % getter additive, preferably 0.3 to 5 wt %, and most preferably 0.5 to 2 wt. % getter additive will do this.

GETTER RECOVERY

The getter blown from the unit is preferably recovered by electrostatic precipitation from regenerator flue gas. A bag house or cyclones may also be used.

EXPERIMENTS

To test the ability of relatively small amounts of relatively fine getter material to preferentially adsorb metals from a metals laden feed, the following laboratory experiments were conducted.

A mixture of a commericially available gamma alumina, from Alpha products having an attrition index estimated at about 10, and a sample of equilibrium regenerated FCC catalyst removed from a commerical unit was made. The mixture of alumina getter and FCC equilibrium catalyst was tested under simulated FCC cracking conditions, namely 1000° F., with the catalyst maintained as a fixed-fluidized bed, which was fluidized with 700-1000 SCFB of helium.

The feed to the bottom of the fluidized bed was an Arab light vacuum gas oil doped with 0.45 weight percent vanadium as vanadium napthanate. Feed properties are shown in Table 1.

TABLE 1

| Arab Light Raw Distillate | |
|---|---|
| Charge Stock | 84D5086 |
| API | 20.0 |
| Hydrogen, Wt. % | 12.2 |
| Sulfur, Wt. % | 2.61 |
| Nitrogen, ppm | 930 |
| Basic Nitrogen, ppm | 294 |
| Pour Point, F | 115 |
| Aromatics, Wt. % (Silica Gel) | 61 |
| Vanadium, as Vanadic Naphthenate | 0.43 wt. % |
| Distillation, Wt. % D2887 | |
| IBP | 736 |
| 5% | 831 |
| 10 | 865 |
| 20 | 897 |
| 30 | 918 |
| 40 | 935 |
| 50 | 953 |
| 60 | 971 |
| 70 | 990 |

The catalyst mixture was then screened to separate the catalyst from the getter additive, and each separate fraction analyzed for metals contamination.

The data presented below in Table 1 show that the alumina material (40/80 mesh) was more than an order of magnitude more selective for vanadium than the equilibrium catalyst. During use, the relatively large (40/80 mesh) alumina getter materials broke down or abraded to form getter "fines". These broken off fragments of getter material were actually the most efficient alumina scavengers. The phenomenon of metals deposition may be solely a surface phenomenon. The getter fines represent a large portion of the surface area available on the virgin getter material.

The alumina fines, which pass through a 200 mesh screen and have a particle size less than 74 microns, produced during fluidization were almost half an order of magnitude more selective for vanadium than the large size alumina.

TABLE 2

| | Vanadium Partitioning Data | | |
|---|---|---|---|
| | Particle Size | | |
| Catalyst | Mesh | Microns | V (ppm) |
| Commercial FCC | 140/170 | 88–105 | 185 |
| Alumina | 40/80 | 177–420 | 2900 |
| Alumina Fines | 200+ | LT 74 | 13000 |

Nickel partitioning was also studied. Nickel partitioned about the same way as vanadium.

If we were practicing the invention now in a commericial refinery, we would add enough getter additive to add 1-2 weight percent (based on catalyst inventory) of getter material consisting of alpha $Al_2O_3$ having a particle size of 10-50 microns, and having an attrition index of about 10. We would add it to the feed.

We claim:

1. A catalytic cracking process wherein a heavy, metals laden feed contacts particles of a hot regenerated catalytic cracking catalyst to crack the feed to lighter products and wherein a majority of the metals content of the feed is deposited on the catalytic cracking catalyst, characterized by adding to the catalytic cracking unit, at the point where hot catalyst contacts metals laden feed, a getter additive having an attrition index of 9-100 in the form of a particle which is of a smaller size than the catalytic cracking catalyst particle and which has an average residence time in the catalytic cracking unit of less than 24 hours.

2. The process of claim 1 further characterized in that the catalytic cracking process is a moving bed catalytic cracking process.

3. The process of claim 1 further characterized in that the catalytic cracking process is a fluidized catalytic cracking process.

4. The process of claim 1 further characterized in that the getter additive is selected from the group of alumina, silica, clay, magnesium oxide, activated carbon, coke, and bauxite.

5. The process of claim 1 further characterized in that the getter additive has a particle size of 10-50 microns.

6. The process of claim 1 further characterized in that the getter additive has an average particle size of 30–40 microns.

7. The process of claim 1 wherein the getter additive is mixed with the feed.

8. The process of claim 3 further characterized in that the getter additive is added to the base of a FCC riser reactor.

9. The process of claim 1 further characterized in that the getter additive is alumina having a density of 1 to 5 g/cc apparent bulk density, a particle size of less than 50 microns, and an attrition index of 9-80.

10. The process of claim 1 further characterized in that the getter additive has an attrition index 50% higher than that of the cracking catalyst.

11. The process of claim 1 further characterized in that the residence time is less than 10 hours.

12. A catalytic cracking process wherein a heavy, metals laden feed contacts a hot regenerated catalytic cracking catalyst to crack the feed to lighter products and wherein a majority of the metals content of the feed is deposited on the catalytic cracking catalyst, characterized in that a short residence time getter additive is added to the feed to produce a catatlyst inventory containing 0.1–5.0 weight percent getter additive, wherein the getter additive is at least an order of magnitude more selective for vanadium than the cracking catalyst on a weight basis, the getter additive has an average particle diameter less than one half of the aver particle diameter of the cracking catalyst, and at the conditions existing in the cracking unit the getter additive is discharged from the unit with catalyst fines and the average residence time of the getter additive in the cracking unit is less than 10 hours.

13. The process of claim 12 further characterized in that the catalyst cracking process is a fluidized catalytic cracking process.

14. The process of claim 12 further characterized in that the amount and vanadium selectivity of the getter additive are sufficient to adsorb at least a majority of the heavy metals in the feed.

15. The process of claim 12 wherein a majority of the getter additive is removed from the cracking unit within one hour.

16. The process of claim 12 further characterized in that the getter additive is selected from the groups of alumina, silica, clay, magnesium oxide, activated carbon, coke, and bauxite.

17. The process of claim 12 further characterized in that the getter additive has a particle size of 10–50 microns.

18. The process of claim 12 further characterized in that the getter additive has an average particles size of 30–40 microns.

19. The process of claim 12 further characterized in that the getter additive is mixed with the feed.

20. The process of claim 12 further characterized in that the getter additive is recovered from a regenerator flue gas stream by electrostatic precipitation.

21. The process of claim 12 further characterized in that the getter additive is recovered from a cracked product gas stream using a cyclone separator.

22. The process of claim 13 further characterized in that the getter additive is added to the base of a FCC riser reactor.

23. The process of claim 12 further characterized in that the getter additive is alumina having a bulk density of 1 to 5 g/cc, and an average particle size of less than 50 microns.

24. The process of claim 12 further characterized in that a heavy product contaminated with catalyst fines is recovered as a bottoms product from a product fractionator, and the heavy product is clarified by allowing catalyst fines to settle in a slurry settler and the getter additive is added to the slurry settler.

* * * * *